April 28, 1959 H. EPSTEIN 2,884,618

FERROELECTRIC LOGICAL CIRCUIT

Filed May 14, 1954

INVENTOR
HERMAN EPSTEIN
BY
Edward J. Da Rin
AGENT 2,884,618

FERROELECTRIC LOGICAL CIRCUIT

Herman Epstein, West Chester, Pa., assignor to Burroughs Corporation, Detroit, Mich., a corporation of Michigan Application May 14, 1954, Serial No. 429,792

2 Claims. (Cl. 340—173)

This invention relates to non-linear bistable circuits and more particularly to means for detecting the storage state of non-linear bistable memory devices.

High-speed electronic computers may require a memory device to carry out many of its functions. The memory device may be static or permanent, or dynamic or temporary. A problem common to these memory devices is providing an access time within the range of speeds consonant with the other units of the computing system, A rapid access time is especially desired for permanent storage devices. In addition to rapid access it is desirable to provide a memory device operable at low powers both to drive the device itself and elements driven therefrom. These features must be also considered along with the factors of space and cost.

Ferroelectric and ferromagnetic devices of non-linear characteristics have a bistable property which is readily adaptable to the permanent storage of binary information since the binary notation is based on a radix of two. Ferroelectric and ferromagnetic materials are known which display this non-linear characteristic. Certain of these ferroelectric and ferromagnetic materials may exemplify this non-linear characteristic as a square polarization or hysteresis loop. Ferroelectric materials are also known which exhibit a non-linear characteristic, other than a square loop, and for purposes of this specification and the appended claims the term non-linear is to be construed to include not only such materials having a square loop characteristic, but also those which do not exhibit a loop characteristic. The ferroelectric materials may be incorporated as a dielectric in a capacitor and thereby utilize the bistable characteric for storage purposes. The ferromagnetics may be utilized as the cores for inductive reactances for storing the binary information. These bistable devices have the advantage of being operable at high speeds with low power input. Furthermore, physically, the devices occupy a small space and are relatively low cost elements. The devices may be utilized for permanent storage much the same as flip-flops.

It is desirous to utilize these devices because of the aforementioned advantages along with the permissible rapid access time. Furthermore, the bistable properties of this general type of elements have the advantage that a pulse output is obtained directly as opposed to other types of flip-flops from which a mere change in D.-C. level is provided. When a pulse is applied to one of these non-linear storage devices that will switch the storage condition of the device, there is a relatively large change in capacitance and/or inductance during this switching period. In experiments leading up to this invention, it was found that these relatively large changes may be taken advantage of to detect the state of the storage devices and provide an output signal which is not critical. Accordingly, an electrical circuit is desired to utilize this reactance change during the switching period.

In a co-pending application of Herman Epstein, Serial No. 368,250, filed July 16, 1953, entitled "Binary Storage Means and Methods," and assigned to the same assignee as this application, there is described and claimed certain circuits wherein non-linear bistable storage devices are employed as switching reactances in tuned resonant circuits.

It is, therefore, a general object of the invention to provide improved electrical circuits for storing information and for detecting such information.

It is another important object of the invention to provide improved electrical circuits employing materials having non-linear characteristics for storing information and for providing rapid access time thereto.

It is still another important object of the invention to provide improved electrical circuits for binary storage of information which incorporate reactance devices utilizing materials of a non-linear characteristic and permit rapid access time.

It is a further important object of the invention to provide improved information storage circuits including rugged and reliable bistable devices having loop characteristics and low cost and low power operating detection means for determining the storage state of the devices.

It is still a further important object of the invention to provide improved detection circuits for bistable reactive storage devices exemplifying a square loop characteristic wherein the reactance change during the switching period is utilized to detect the storage state.

The above and related objects are achieved by providing one or more suitable non-linear bistable storage devices in a simplified electrical network. The bistable devices may have a square loop non-linear characteristic and be arranged in a time constant network to determine the storage state of the devices. The non-linear devices may also be included in logical circuit networks.

Other objects and features of advantage of the present invention will be found throughout the following more detailed description of the invention particularly when considered with the accompanying drawing in which like reference characters refer to similar elements and wherein.

Figure 1:
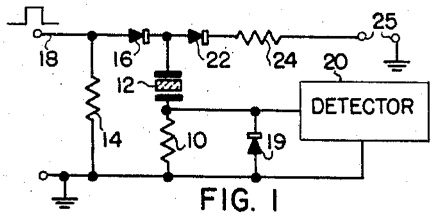
Fig. 1 is a schematic circuit diagram of a bistable storage network constructed in accordance with the invention.
Figure 2:
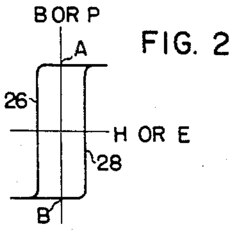
Fig. 2 is a graphical illustration of a typical characteristic of bistable materials utilized in the invention.

Referring now to Figs. 1 and 2, one form of the invention for storing information and for detecting such information will be described. The method of detection or read out in this particular embodiment results from the utilization of an R–C time constant network which employs a non-linear capacitor. The R–C time constant network comprises the series combination of the resistor 10 and the non-linear capacitor 12. The input circuit to the RC combination comprises the resistor 14 and the diode 16. The resistor 14 is arranged in parallel with the RC network and the diode 16 is in series with the input lead 18 and couples the resistor 14 and the capacitor 12 together. The diode 16 is arranged with its anode connected to the resistor 14 and its cathode to a plate of the capacitor 12.

The output circuit of the storage device of Fig. 1 is coupled between the resistor 10 and the capacitor 12 and the ground connection. The output circuit comprises the diode 19 and the detector 20 arranged across the resistor 10. The cathode of the diode 19 is common to the connection between the resistor 10 and capacitor 12 and the detector 20, and is so arranged to prevent pulses of an undesired polarity from reaching the input circuit of the detector 20 which may be the input of an oscilloscope. The oscilloscope allows a visual indication of the waveforms illustrated in Fig. 3.

A further circuit for resetting the capacitor 12 may be provided and in this instance comprises the series arrangement of the diode 22 and the resistor 24 coupled to the top plate of the capacitor 12 as illustrated in Fig. 1. The reset terminals are denoted by reference numeral 25 and one of same is connected to ground. The diode 22 has its anode common to the capacitor 12 and the cathode of the diode 16. This resetting circuit allows pulses of an opposite polarity from the input pulses to be stored in the capacitor 12.

The capacitor 12 is provided with a dielectric having a non-linear characteristic. The polarization characteristic approaches the square loop illustrated in Fig. 2. Materials that exhibit this square loop polarization are crystals or ceramics of barium titanate, Rochelle salts, niobates, and the like. This general class of materials have been termed in the art as ferroelectrics and have been utilized in the past as dielectrics in capacitors. The two stable states of these materials, which may be denoted as A and B, are readily adaptable to the storage of binary information. The square loop illustrated in Fig. 2 is an ideal representation; in practice the ferroelectrics have been found to have square loops with the vertical sides corresponding to those as indicated by the reference numerals 26 and 28 extending at a slightly acute angle to the ordinate. The slope of either of these lines indicates a change in capacitance C and may be expressed as follows:

$$C\alpha A\frac{dP}{dE}$$

where $A$=area of the plates, $P$=polarization and $E$= applied voltage gradient. It may now be appreciated that if a pulse is applied to a ferroelectric capacitor that will cause it to switch from point A to point B or the reverse, there will be a change in the capacitance during this switching period. Accordingly, there will be a change in the capacitive reactance and hence a change in the time constant of the RC networks employing these types of ferroelectric capacitors. This change may be determined by detecting the slope of the output pulse derived from the RC network. It is preferable to have the time duration of the input pulse equivalent to the switching period. The change in the time constant during this switching interval as a result of the aforementioned capacitance change may be 1000 times the resulting time constant during a non-switching interval and the detection of same does not require sensitive means. The reactance change during the switching period also results in a change in voltage division between the resistance and capacitance. The detection of the relative amplitudes across either one, resistance or capacitance, during this period affords a convenient means for detecting the storage state of the ferroelectric capacitor 12.

Figure 3:
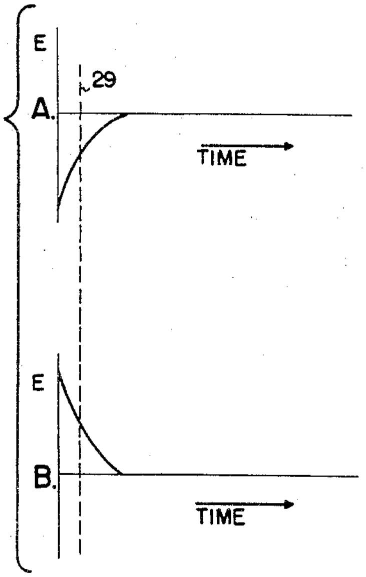
Fig. 3 is a graphical illustration of typical output waveforms obtained with the embodiment of Fig. 1.

The change in amplitude and slope may be readily appreciated by reference to the illustrations of Fig. 3 wherein the output voltages across the resistor 10 under various conditions is illustrated. Fig. 3A is representative of the output voltage waveform that may result when the capacitor 12 is switched from state A to state B and Fig. 3B is illustrative of the resulting waveform in switching from B to A. Also, it has been found that driving the capacitor 12 to the same stable state in which it already resides results in a small R–C time constant and small output voltage. Since the change in capacitance during this operation is relatively small, the smaller output voltage resulting is as may be expected in view of the description hereinbefore.

Now referring back to the schematic circuit diagram of Fig. 1, the read out operation will be more fully described. The circuit as arranged will receive a positive input pulse on the lead 18 and a negative pulse at the reset terminals 25. However, the polarities of the input pulses that may be received at the input lead 18 and the reset terminals 25 may be reversed by reversing the diodes 16, 19, and 22. The delivery of a positive pulse to the circuit arrangement of Fig. 1 will charge the ferro-electric capacitor 12 to state A through the charging circuit loop comprising diode 16, capacitor 12 and resistor 10. The charging voltage across the capacitor 12 will have the reverse characteristics of the voltage characteristics of the resistor 10 as illustrated in Fig. 3. More specificaly, the voltage will start out at zero and build up exponentially to some final value as opposed to the resistor voltage being initially at a fixed potential and decreasing exponentially to zero. When the capacitor 12 is rest from state A to state B the charging current flow through the capacitor 12 will be reversed and follow the loop provided by diode 22, resistor 24 and resistor 10. Therefore, it may be seen that the amplitude or shape of the output waveform across either the resistance or capacitance may be detected as will be explained hereinafter.

In order to detect the amplitude of the output voltage the detector 20 coupled across the resistor 10 may be biased at a predetermined voltage amplitude level, such as the levels produced by the switching operations represented in Figs. 3B and D. The detector 20 may conduct upon exceeding this predetermined level which indicates a switching of storage state. In addition to an oscilloscope output and the biased detector 20 hereinbefore mentioned, the detector 20 may be any amplitude sensitive device known in the art, such as a flip-flop, biased detector, class C amplifier or the like. In order to detect the slope of the output voltage a coincidence detector may be employed with the complementary coincidence pulse arranged to arrive at some point in time such as indicated by the dotted line 29 of Fig. 3.

Figure 4:
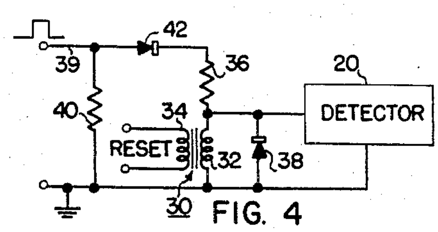
Fig. 4 is a schematic circuit diagram of another bistable network constructed in accordance with the invention.

Referring now to the modification of Fig. 4, the schematic circuit diagram of an RL time constant network employing a bistable ferromagnetic inductance device will be explained. The inductance device 30 is provided with a core of ferromagnetic material having a square loop hysteresis characteristic approaching the square loop illustrated in Fig. 2. The inductance device 30 comprises the aforementioned square loop material having an input winding 32 and reset winding 34 wound thereon. The change in reactance of the device 30 during the switching period may again be utilized as in the aforementioned ferroelectric devices to produce a change in the time constant of the RL combination of the resistor 36 and inductive reactance device 30. The hysteresis characteristic of the ferromagnetic material may have the sides corresponding to those identified by the reference characters 26 and 28 only at a slightly acute angle to the ordinate. This slope may indicate a change in inductance and since the inductance is a function of $u$, it may be expressed as follows:

$$u=\frac{dB}{dH}$$

where $u$=magnetic permeability and is directly proportional to $d$B, the change of flux per unit area and inversely proportional to $d$H, the change of magnetic field intensity. It may now be appreciated, as in the embodiment of Fig. 1, that if a pulse is applied to the ferromagnetic which is coextensive with the switching period there will be a change in the inductance during this period and consequently a change in the time constant of the R-L combination.

The voltage and current characteristics of an R-L circuit are substantially the same as those for an R-C circuit.

Therefore, as previously described in conjunction with the R-C time constant network, there will be a change in both the amplitude and the slope of the output voltage, substantially as illustrated in Fig. 3, and either may be detected to determine the storage state of the inductive reactance device 30. The amplitude detector 20 may be of the same general types as employed in the embodiment of Fig. 1. The detector 20 in this particular embodiment is coupled across the inductance 32 and the diode 38. The input circuit is arranged to receive positive triggering pulses, on the input lead 39, by means of the combination of the resistor 40 and the diode 42. The positive pulses are effective to flip the ferromagnetic device to state A and may be switched to state B through the application of a negative pulse to the reset winding 34.

Figure 5:
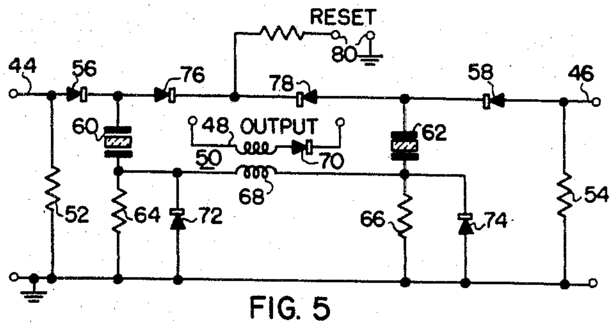
Fig. 5 is a schematic circuit diagram of a logical circuit constructed in accordance with the invention.

Referring now to Fig. 5, the schematic circuit diagram of a logical mutually "exclusive or" circuit will be explained. The term mutually "exclusive or" denotes a two input circuit in which an output pulse will result if an input pulse is delivered to either one of the inputs but not to both simultaneously. The function performed by a mutually "exclusive or" is also known in the art as an "inhibit" circuit. The input pulses may be applied to the input leads 44 or 46 and the output pulse will be produced across the secondary coil 48 of the pulse transformer 50. The input leads 44 and 46 are arranged with their respective resistors 52 and 54 and diodes 56 and 58 to allow a positive pulse to be coupled to the bistable storage devices. The bistable storage devices in this instance may be the ferroelectric capacitors 60 and 62 arranged in an R-C time constant network with the resistors 64 and 66. The polarization characteristic of the capacitors may be a square loop as described in conjunction with the embodiment of Fig. 1.

Upon the delivery of a positive pulse to the capacitor 60, that will switch the storage state of same, a current will flow through the primary coil 68 of the output transformer 50. The current flow will necessarily result in the production of an output pulse in the secondary coil 48 and through the diode 70. The diode 70 is arranged to allow only the pulses of a desired polarity to be derived from the output transformer 50, in this particular embodiment the diode 70 is arranged to pass positive pulses. Assuming the characteristics of the capacitors 60 and 62 to be substantially the same, the voltage and current characteristics of the two R-C networks will be substantially the same. Therefore, upon the simultaneous application of positive switching pulses to the input terminals 44 and 46 there will be substantially negligible output in the secondary coil 48. This may be readily appreciated since the switching of the states of the two capacitors 60 and 62 will cause current to flow through the primary coil 68 in opposite directions which will substantially offset or cancel one another. The diodes 72 and 74 are provided, as in the aforementioned embodiments, to prevent the appearance of unwanted pulses or pulses of opposite polarity in the output. The resetting of the ferroelectric capacitors 60 and 62 may be produced through the arrangement of the diodes 76 and 78. The diodes 76 and 78 are arranged to conduct upon the application of a negative pulse to the reset terminals 80. This diode arrangement allows both of the ferroelectric capacitors 60 and 62 to be reset simultaneously. As previously described in conjunction with the aforementioned embodiments, the polarity of the pulses that may be received at either the inputs and the reset terminals may be reversed by reversing the direction of the diodes associated with the network.

Figure 6:
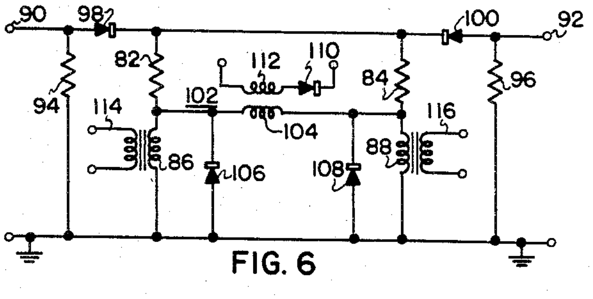
Fig. 6 is a schematic circuit diagram of another logical circuit constructed in accordance with the invention.

Referring now to Fig. 6, the schematic circuit diagram of a logical mutually "exclusive or" circuit employing a pair of R-L time constant networks will be explained. The R-L networks consist of the resistors 82 and 84 and the inductance devices 86 and 88. The latter devices are provided with cores of ferromagnetic materials having the characteristics substantially as described in conjunction with the embodiment of Fig. 4. The input circuits to the time constant networks are arranged to deliver pulses thereto of positive polarity by means of the input leads 90 and 92. This is accomplished in each input circuit by the arrangements of the resistors 94 and 96 and the diodes 98 and 100 coupled to the corresponding input leads 90 and 92. The resistors 94 and 96 are each connected between their respective input terminals 90 and 92 and ground. The diodes 98 and 100 are connected between their respective input terminal and the associated R-L time constant network. The output transformer 102, in this instance, has its primary coil 104 arranged with one terminal connected to the junction between the resistance and inductance of each time constant network. A diode is connected between this same point and ground, the diodes in the two time constant networks being identified by the reference numerals 106 and 108. As in the other embodiments the diodes are provided to prevent pulses of an undesirable polarity from the output, just as the diode 110 is provided in the secondary coil 112. The inductance devices 86 and 88 may be reset by the application of a negative pulse to the reset windings 114 and 116 respectively on the cores. The cancelling action of the currents flowing through the primary coil 104 is substantially the same as in the embodiment described in conjunction with Fig. 5.

Figure 7:
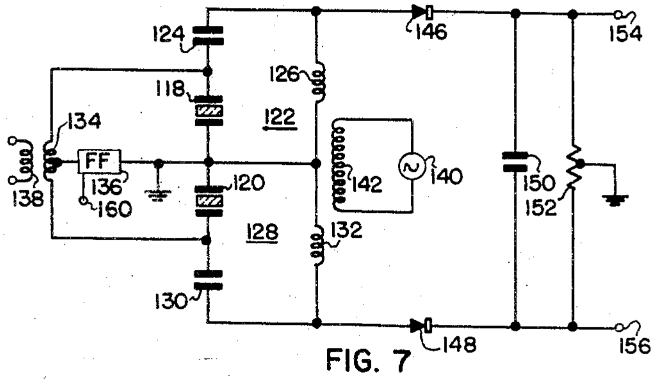
Fig. 7 is a schematic circuit diagram of another embodiment constructed in accordance with the invention.
Figure 8:
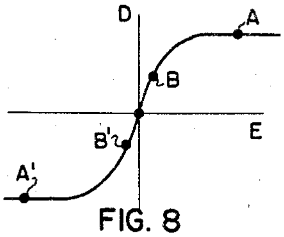
Fig. 8 is a graphical illustration of a dielectric characteristic utilized in the embodiment of Fig. 7.

Referring now to Figs. 7 and 8, a gating circuit employing a pair of non-linear capacitors will be explained. The non-linear capacitors 118 and 120 in this case may have a non-linear characteristic substantially as illustrated in Fig. 8. The upper right hand quadrant of Fig. 8 represents the characteristic plot of displacement vs. voltage for the capacitor 118 and the lower left hand quadrant is representative of the characteristic for the capacitor 120. The non-linear displacement is such that the bistable effect may be realized through the application of the proper potentials to the capacitors 118 and 120 so that they may be polarized at either state A or state B (or A′ and B′) as indicated in Fig. 8. The non-linear capacitor 118 is incorporated in the tuned circuit 122 with the capacitor 124 and inductance 126 while the capacitor 120 coacts in the tuned circuit 128 comprising the capacitor 130 and the inductance 132. The tuned circuits 122 and 128 may both be tuned to the same frequency. The non-linear capacitors 118 and 120 are further incorporated with the input coil 134. Each of the end terminals of the input coil 134 are coupled to one of the non-linear capacitors at the point common to the non-linear capacitor and the capacitor associated with them in the tuned circuits. A flip-flop circuit 136 is coupled between a point substantially mid-way between the end terminals of the coil 134 and the plate of each non-linear capacitor connected to a common point or in this instance ground potential. An input terminal 160 carries pulses into the flip-flop circuit to trigger said circuit to change its state and thus produce an output pulse to winding 134.

The displacement of the non-linear capacitors 118 and 120 is partially controlled by the output voltage of the flip-flop 136. A further input coil 138 is provided to control the displacement of the non-linear capacitors and is coupled to the coil 134. Whenever the output voltage of the flip-flop 136 and the input pulse to the coil 138 are of the same or opposite polarity, their resultant effect upon the non-linear capacitors 118 and 120 are such as to charge the capacitors in opposite states. This may be more readily appreciated by noting that the output of the flip-flop 136 will cause a current flow in the two sections of the coil 134 to flow in opposite directions and the voltage produced thereby is added to the voltage coupled from the coil 138. As a result of this opposite current flow, voltages of opposite polarity are impressed on the two tuned circuits and the tuned circuits then have their frequencies shifted in opposite directions. In order to utilize this frequency shift, much like a discriminator action, an R-F source of the same frequency as the frequency of the tuned circuits 122 and 128 such as the source indicated by the reference numeral 140 is coupled to the two tuned circuits through the coil 142. With the shift in frequencies the output voltages derived from the tuned circuits 122 and 128 are no longer 180° out of phase so as to substantially cancel one another and an output voltage results.

The output voltages of the tuned circuits 122 and 128 may be detected by the diodes 146 and 148 which are coupled to the ungrounded end of each tuned circuit. The detected voltages are combined by the capacitor 150 and resistor 152. The resistor 152 is center-tapped to provide a return path back to the tuned circuits. The resulting output voltage may be derived across the output terminals 154 and 156.

The aforementioned circuit operation results due to the voltages of opposite polarity being applied to the nonlinear capacitors 118 and 120. As previously mentioned, the charge is controlled by the coincidence of pulses of the same or opposite polarity being applied to the capacitors 118 and 120 by means of the flip-flop 136 and the input coil 138. This may be termed a logical "and" or coincidence circuit whenever the capacitors 118 and 120 have a polarization characteristic substantially as illustrated in Fig. 8. The dielectric material of the capacitors may be anything exhibiting the aforementioned characteristic including ferroelectrics. The "and" or coincidence circuit is particularly advantageous because an output is produced across terminals 154 and 156 regardless of the polarity of the input pulses which occur coincidentally. Thus if $a$ and $b$ are respectively the input from input winding 138 and the output from flip-flop circuit 136, the output across terminals 154 and 156 represent the logic $(\pm a \cdot \pm b)$.

It is, therefore, clear from the foregoing description that the present invention has advanced the art by providing a permanent storage device which allows permanent storage and rapid access times. The reactances are incorporated in time constant networks and the variance in the reactance during the switching period modifies the output voltage sufficiently to allow a simple and reliable method of detecting the storage state of same.

Having therefore described detailed embodiments of the invention and setting forth its organization, these features believed descriptive of the nature of the invention are defined in the appended claims.

What is claimed is:

1. A circuit for performing the exclusive or logical function, said circuit comprising, a first network comprising a first ferroelectric storage device connected in series with a first parallel circuit comprising a first resistance shunted by a first asymmetrically conducting device; a second network comprising a second ferroelectric storage device connected in series with a second parallel circuit comprising a second resistance shunted by a second asymmetrically conducting device, each of said ferroelectric storage devices being adapted to assume either of two stable states of electric field polarity; a transformer having primary and secondary windings, one end of said primary winding being connected to the common junction of said first ferroelectric storage device and said first parallel circuit and the other end being connected to the common junction of said second ferroelectric storage device and said second parallel circuit; means for applying a voltage pulse of one polarity simultaneously across both said first and second networks to set each of said ferroelectric storage devices in the same one stable state of polarity; first and second input circuits for applying an input voltage pulse of opposite polarity to either said first or second network to switch either said first or second ferroelectric storage device to its other stable state of polarity, whereby, in response to said switching, current is driven through said transformer primary winding; and means, including said transformer secondary winding, for deriving an output pulse in response to said current flow through said primary winding, the parameters of said first and second networks being such that in the event of the application of input pulses simultaneously thereto, and in response to the resulting simultaneous switching of said first and second ferroelectric storage devices, currents tend to flow through said transformer primary winding in opposing directions and in substantially equal amounts, whereby the net current flow through said transformer primary is substantially zero and no output pulse is developed.

2. An exclusive or logical circuit comprising, first and second networks each comprising a ferroelectric storage device in series with a resistance, each of said ferroelectric storage devices being capable of assuming either of two stable states of electric field polarity; an inductive winding connecting together that one side of each of said ferroelectric storage devices which is also connected to said series resistance, whereby each of said series resistances is shunted by a series circuit comprising said inductive winding and the other of said series resistances; means for applying a reset voltage pulse of one polarity to said first and second networks simultaneously to place both said ferroelectric storage devices in the same one stable state of polarity; means for applying an input voltage pulse of other polarity to either said first or said second network to switch that one of said ferroelectric storage devices which is included in the network to which said input pulse is applied, whereby, in response to the switching of said ferroelectric storage device, a current is driven through said inductive winding; and means responsive to the flow of current through said inductive winding for developing an output pulse, the circuit parameters being such that in the event of the application of input pulses of said other polarity simultaneously to both said first and second networks and in response to which both ferroelectric storage devices switch, substantially equal currents tend to flow through said inductive winding in opposing directions, whereby no output pulse is developed.

References Cited in the file of this patent

UNITED STATES PATENTS

| | | |
|---|---|---|
| 2,614,167 | Kamm | Oct. 14, 1952 |
| 2,695,993 | Haynes | Nov. 30, 1954 |
| 2,717,373 | Anderson | Sept. 6, 1955 |
| 2,736,880 | Forrester | Feb. 28, 1956 |

OTHER REFERENCES

Publication II, Electrical Engineering, October 1952, pp. 916–922.

Publication IV, "Snapping Dipoles of Ferroelectrics As Memory Element For Digital Computers," (Pulvari), Proceeding of Western Computer Conference, pub. June 1953, pp. 149 and 158.

Publication V, Thesis on Magnetic Cores (Haynes), December 28, 1950, pp. 36–38.

Publication I, Proc. IRE, June 1950, pp. 626–629.

Publication III, Proc. Assoc. (Comp. Mach.), May 1952, pp. 223–229.